United States Patent [19]
Kawaguchi

[11] Patent Number: 5,293,244
[45] Date of Patent: Mar. 8, 1994

[54] REAR PROJECTION TYPE TELEVISION UNIT

[75] Inventor: Yoshihiro Kawaguchi, Tokyo, Japan

[73] Assignee: Pioneer Electronic Corporation, Tokyo, Japan

[21] Appl. No.: 859,252

[22] Filed: Mar. 26, 1992

Related U.S. Application Data

[63] Continuation of Ser. No. 631,317, Dec. 21, 1990.

[30] Foreign Application Priority Data

Jul. 13, 1990 [JP] Japan .................. 2-74631[U]

[51] Int. Cl.⁵ .............. H04N 5/72; H04N 5/64; H04N 5/655
[52] U.S. Cl. .................. 348/789; 312/7.2; 348/787
[58] Field of Search .............. 358/231, 237, 254, 60, 358/245, 249, 248; 312/7.2, 263, 265.1; 455/346-351; H04N 5/72, 5/64-5/655

[56] References Cited

U.S. PATENT DOCUMENTS

| | | | |
|---|---|---|---|
| 4,403,815 | 9/1983 | Runco | 358/237 |
| 4,481,512 | 11/1984 | Tscheulin et al. | 455/346 |
| 4,707,746 | 11/1987 | Nishikawa | 358/231 |
| 4,807,292 | 2/1989 | Sorscher . | |
| 4,820,224 | 4/1989 | Lemche | 358/248 |
| 4,836,625 | 6/1989 | Catta | 312/265.1 |
| 4,843,477 | 6/1989 | Mizutani et al. | 358/248 |
| 4,918,535 | 4/1990 | Grabis et al. | 358/231 |

FOREIGN PATENT DOCUMENTS 63244091  4/1990  Japan .................. H04N 5/74

OTHER PUBLICATIONS

The Trooper, American Video Communication, 1986.

*Primary Examiner*—James J. Groody
*Assistant Examiner*—Glenton B. Burgess
*Attorney, Agent, or Firm*—Sughrue, Mion, Zinn, Macpeak & Seas

[57] ABSTRACT

A rear projection type television unit comprises a television body having an outer casing in which electric and optical parts are accommodated and a front panel detachably attached to a front portion of the television body so as to entirely cover the front portion thereof. The television of the structure described above is accommodated in a wall structure of a chamber so that the front surface of the front panel lies on the same level as that of a front surface of the wall structure when the television body is accommodated in a wall structure. The television unit is safely and stably supported in the recessed portion formed in the wall structure by support members such as angle members secured to the side portions of the television body by engaging the same with support members secured to the wall structure.

8 Claims, 3 Drawing Sheets

REAR PROJECTION TYPE TELEVISION UNIT

This is a continuation of application Ser. No. 07/631,317 filed Dec. 21, 1990.

BACKGROUND OF THE INVENTION

This invention relates to a rear projection type television unit particularly capable of being accommodated in a wall structure of a house and the like.

A rear projection type television unit generally includes cathode ray tubes (CRT) respectively for projecting red (R), green (G) and blue (B) colors and color light beams emitted from the respective CRT are irradiated on the rear surface of a screen attached to a cabinet of the body of the television to thereby form or realize a color image on the front surface of the screen. Such rear projection type television unit is set in a chamber of ordinary domestic houses or business building.

However, the rear projection type television unit of this kind has generally a large size cabinet, thus occupying substantial space for the setting thereof in the room of the house, thus being inconvenient. Moreover, when such a large size television unit is set in an ordinary house, it may be impossible to observe the television screen with a suitable predetermined distance being kept between a viewer and the screen of the television unit.

Furthermore, in another aspect, the cabinet or front panel of the television cannot be usually exchanged with another one even in a case where various decorations provided on the surface of the cabinet or front panel do not match with the decorations or interiors in the room, thus being also inconvenient.

SUMMARY OF THE INVENTION

An object of this invention is to substantially eliminate defects of drawbacks encountered in the prior art described above and to provide a rear projection type television unit having a front panel to be detachable secured to a television body so as to match with decoration or interior in a room in which the television unit is arranged.

Another object of this invention is to provide a rear projection type television unit disposed in a wall of a room so as to effectively utilize a space in the room.

These and other objects can be achieved according to this invention, in one aspect, there is provided a rear projection type television unit comprising a television body having an outer casing in which electric and optical parts are accommodated and a front panel detachably attached to a front portion of the television body so as to entirely cover the front portion thereof.

In another aspect, there is provided a rear projection type television unit of the type which is accommodated in an accommodating portion formed in a wall structure of a chamber, comprising a television body having an outer casing which is accommodated in the wall structure and in which electric and optical parts are accommodated and a front panel detachably attached to a front portion of the television body so as to entirely cover the front portion thereof, the front panel having a front surface lying on the same level as that of a surface of the wall structure when the television body is accommodated in the accommodating portion.

In a preferred embodiment, the television unit further comprises supporting members such as angle members for supporting the television body to the wall structure and the supporting members are engaged with members secured to the wall structure.

According to the rear projection type television unit of the structure described above, the front panel is detachably secured to the front portion of the television body, so that the panel can be exchanged with another one in conformity with decoration or interior of the chamber in which the television unit is disposed. In another aspect, the rear projection type television unit is accommodated in a recessed portion formed in the wall structure of the chamber in a manner such that the television body is first accommodated in the wall structure and then the front panel is attached to the front portion of the television unit so that the front surface of the front panel lies on the same level as that of the wall surface, thus the space of the chamber being effectively utilized. The television unit can be exactly and stably positioned in the recessed portion of the wall structure by engaging the support members secured to the outer surface of the television body to the support members secured to the wall structure. This invention may be also effectively utilized for the commercially sold rear projection type television unit.

In another aspect, there is provided a rear projection type television unit comprising a rear projection type television, an accommodating portion formed in a wall structure, the accommodating portion accommodating the rear projection type television and supporting members for supporting the rear projection type television in the accommodating portion.

In a preferred embodiment, the rear projection type television comprises a panel having a screen and not detachably secured to a body, and the supporting members comprise first angle members secured to the rear projection type television and second angle members secured to the accommodating portion, the first angle members being supported to the second angle members.

According to the rear projection type television unit of the structure described above, a commercially sold rear projection type television can be accommodated in the wall structure of the chamber.

BRIEF DESCRIPTION OF THE DRAWINGS

For a better understanding of this invention and to show how the same is carried out, reference is now made, by way of preferred embodiments, to the accompanying drawings, in which.

DESCRIPTION OF THE PREFERRED EMBODIMENTS

Figure 1:
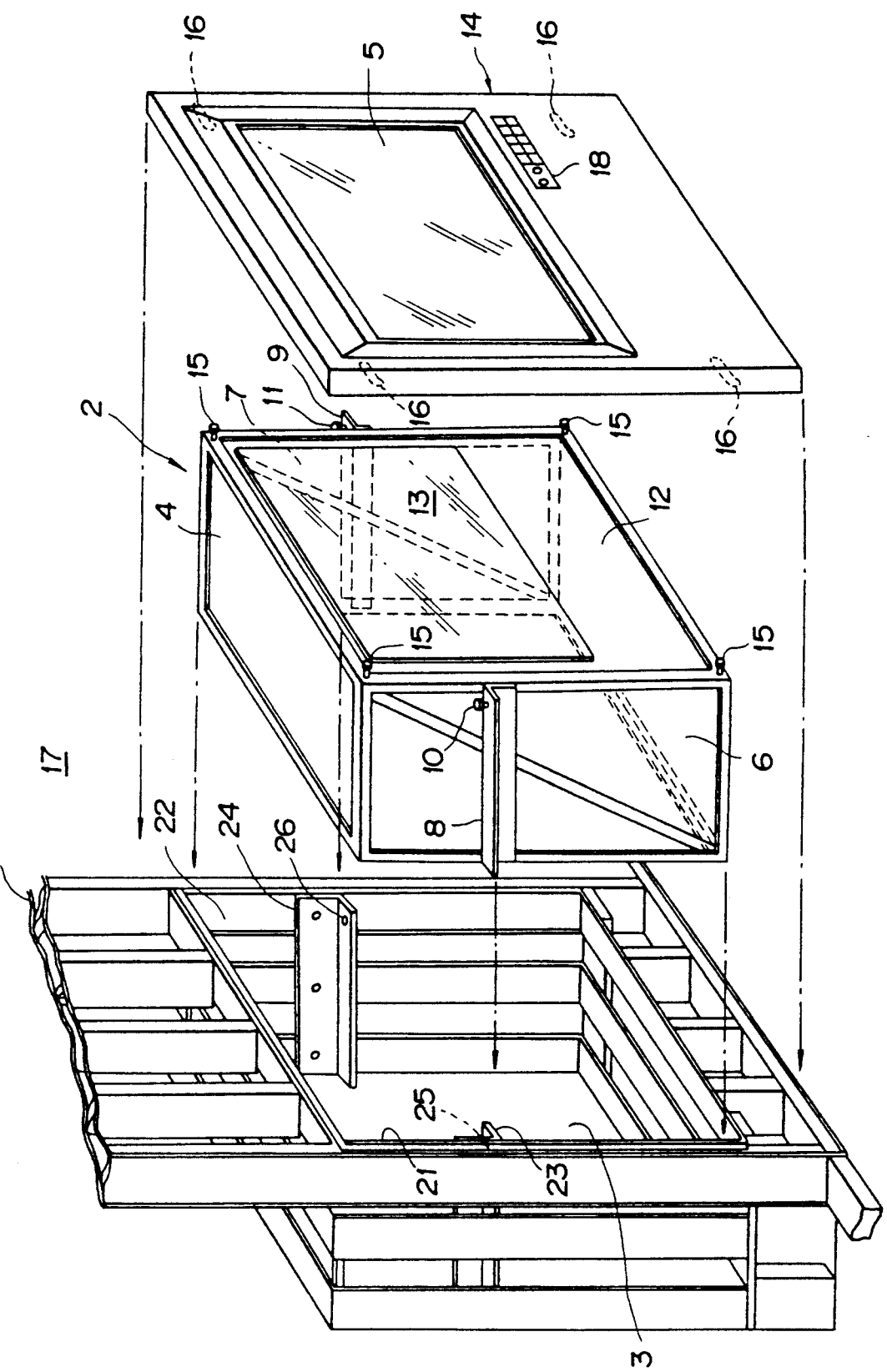
FIG. 1 is a developed perspective view of a rear projection type television unit according to one embodiment of this invention.
Figure 2:
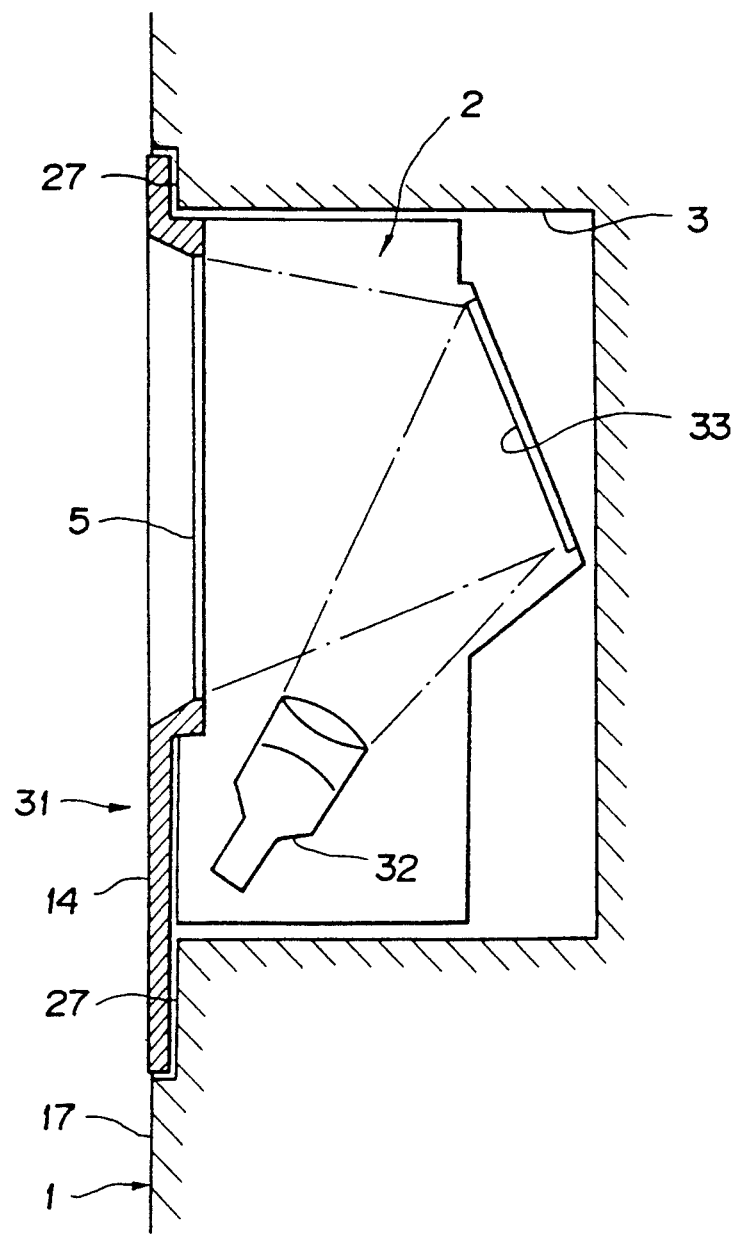
FIG. 2 is a brief sectional view showing a condition in which the television unit shown in FIG. 1 is accommodated in a wall structure.

FIGS. 1 and 2 represent a first embodiment of a rear projection type television unit according to this invention.

Referring to FIG. 1, reference numeral 1 denotes a wall structure of a chamber of an ordinary domestic house or business building and a recess having substantially rectangular structure is formed in the wall structure 1 as an accommodating portion 3 for receiving or accommodating a body 2 of a rear projection type television unit. The television body 2 comprises an outer casing 4 having a rectangular structure in which are accommodated electric parts and optical parts for forming color images on the front surface of a screen 5 of the television unit.

The outer casing 4 having both side surfaces 6 and 7 to which substantially L-shaped angle members 8 and 9 as support members for supporting the body 2 of the television unit in the accommodating portion 3 are secured so as to project outwardly from the side surfaces 6 and 7. Through holes for the insertion of fastening members such as bolts 10 and 11 are formed on the front sides of the angle members 8 and 9. The casing 4 also has a front portion 12 as an opening to which a transparent plate 13 for protecting the electric and optical parts arranged therein is secured. A front panel 14 for entirely covering the front portion of the television body 2 is detachably attached to the front portion thereof at four corners by engaging members 15. The engaging members 15 are engaged with four recesses 16 formed in the panel 14 to thereby detachably mount the panel 14 to the casing 4. The television unit is disposed in the accommodating portion 3 of the wall structure 1 so that the surface of the panel 14, after assemblying the television unit, is on the same level as that of the wall surface 17 of the wall structure 1. Since the body 2 of the television unit is accommodated in the accommodating portion 3 and the front surface thereof is covered by the panel 14, any decoration is not effected to the all surfaces of the television body 2, but the exposed surface of the panel 14 can be decorated so as to match with the interior in the chamber. A control means 18 such as switch element electrically connected to the electric parts and optical parts in the television body 2 is provided for the panel 14, and a speaker, not shown, is disposed at a portion inside the wall surface 17. It is desired that at least either one of the screen 5, speaker and the control means 18 is disposed to the panel 14, but all of these members may be attached to the body 2 of the television unit, and in the latter case, no electric connection element exists between the body 2 and the panel 14, thereby the panel 14 being easily detachable.

The television unit accommodating portion 3 formed in the wall structure 1 has substantially a rectangular shape having both side portions 21 and 22. The inner shape of the wall structure is formed so as to correspond to the outer configuration of the television body 2. Angle members 23 and 24 each having an L-shape cross section are secured to the corresponding side portions 21 and 22 and the angle members 23 and 24 are engaged with the angle members 8 and 9 secured to the body 2 of the television unit so as to stably set and support the television body 2 in the accommodating portion 3 of the wall structure 1. The angle members 23 and 24 have through holes 25 and 26 respectively through which fastening members such as bolts 10 and 11 are inserted.

The assemblying processes of the rear projection type television unit of the structure described above will be explained hereunder.

First, electric elements or parts such as cables for input and output signals, power source codes and the like are electrically connected to the body 2 of the television unit. The body 2 is then accommodated in the accommodating portion 3 formed in the wall structure 1 as shown in FIG. 1. In the accommodated state, the angle members 8 and 9 of the television body 2 are mounted to the angle members 23 and 24 of the wall structure 1. The bolt 10 is inserted through the hole 25 of the angle member 23 and clamped with a nut to thereby fasten the angle member 8 to the angle member 23 and, in the like manner, the bolt 11 is inserted through the hole 26 of the angle member 24 and clamped with a nut to thereby fasten the angle member 9 to the angle member 24, whereby the body 2 of the television unit is positioned in the accommodating portion 3 in the wall structure 1.

The panel 14 is thereafter mounted to the front portion 12 of the casing 4 of the television body 2 in the manner such that the panel 14 and the television body 2 are electrically connected by means of cables, for example, and the engaging members 15 secured to the four corners of the front portion 12 of the casing 4 are engaged with the recesses 16 respectively formed in the panel 14. The panel 14 has an outer configuration slightly larger than the front portion 12 of the casing 4 so that the panel 14 is fitted to the stepped portion 27 (FIG. 2) formed on the wall surface 17 of the wall structure 1 when the television body 2 thus assembled is accommodated in the accommodating portion 3. Accordingly, the front surface of the panel 14 lays on the same level of the wall surface 17, thus giving favorable appearance.

As described above and as shown in FIG. 2, the rear projection type television unit 31 is completely embedded in the wall structure 1, so that no space is required for the location of the television unit 31 in the chamber, thus the chamber being effectively utilized. In the thus arranged rear projection type television unit 31, the color beams emitted from a CRT lens block 32 as one of electric and optical parts are reflected by a reflecting plate 33 as optical parts and then projected on the rear surface of the screen 5, whereby the color image is formed on the front surface of the screen 5.

According to the rear projection type television unit of the described embodiment of this invention, the harmony of the chamber with the television unit can be maintained without changing the television unit by suitably selecting the panel 14 having the decoration matching with the interior of the chamber. Moreover, since the television body 2 provided with the electric and optical elements or parts are accommodated in the accommodating portion 3 of the wall structure 1, the television body 2 can be protected, thus improving the safe maintenance thereof.

In addition, it is not necessary to decorate the television body itself, so that the manufacturing cost of the television body is reduced. The safeness of the television body 2 can be further improved by constructing the outer casing 4 with a refractory material.

In a modification, even in a case where the television body 2 in which the electric and optical elements or parts are accommodated is set in the chamber without locating the same in the wall structure, the panel 14 may be optionally selected so as to match with the interior in the chamber by utilizing a panel being detachable to the front portion of the television body 2. In this modification, it may be necessary to decorate the side surfaces of the television body 2 so as to match with the decoration of the panel attached thereto and the interior in the chamber.

Figure 3:
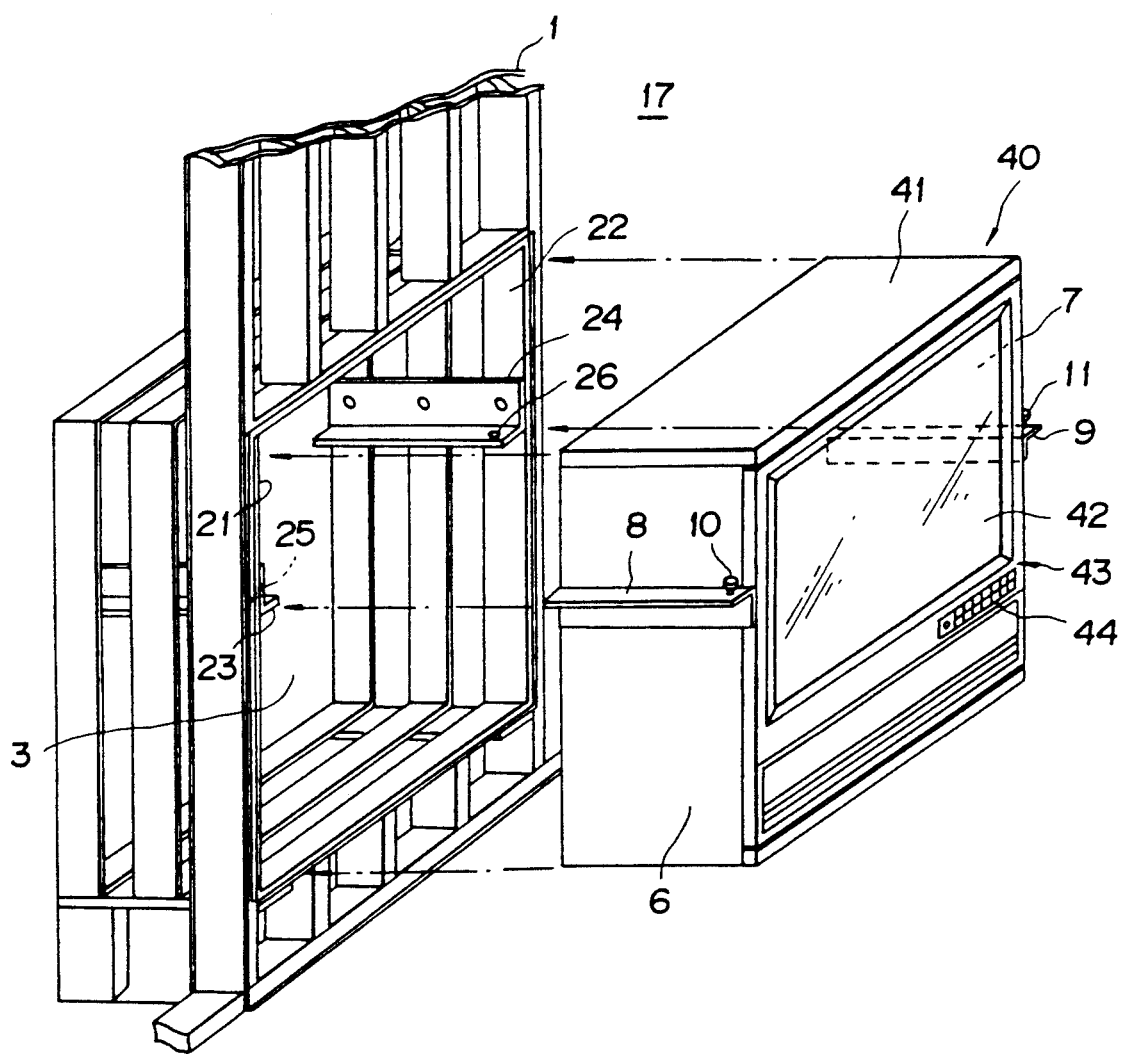
FIG. 3 is a view similar to that of FIG. 1 representing another embodiment according to this invention.

FIG. 3 represents a second embodiment of the rear projection type television unit according to this invention, in which like reference numerals are added to members or portions corresponding to those shown with respect to the first embodiment of FIGS. 1 and 2. Referring to FIG. 3, a commercially sold rear projection type television 40 which is of the type being set in the chamber is accommodated in the accommodating portion 3 formed in the wall structure 1. The assemblying working of the television 40 in the accommodating portion 3 is carried out by fastening the second angle members 23 and 24 secured to the accommodating portion 3 with the first angle members 8 and 9 secured to the rear projection type television 40. In the second embodiment, a panel 43 to which a screen 42 and a control means 44 are attached is secured to the body 41 of the television 40 so as to cover the whole surface of the front portion thereof, but the panel 43 is not detachably secured. According to this embodiment, the commercially sold type rear projection type television unit can be accommodated in the accommodating portion formed in the wall structure.

It is to be understood that this invention is not limited to the described preferred embodiments and many other changes and modifications may be made without departing from the scopes of the appended claims.

What is claimed is:

1. A rear projection type television unit of the type which is accommodated in an accommodating portion recessed in a wall of a room, comprising:
   a television body having an outer casing which is recessed in the wall and in which electric and optical parts are accommodated and having an engaging member; and
   a front panel detachably attached to a front portion of said television body so as to entirely cover the front portion thereof, said front panel being provided with a hole with which said engaging member is engaged, said front panel integrally including control circuitry and a control panel having an operational element for controlling an operation of said television unit, a screen on which color images are formed, and a portion adapted to cover a loudspeaker, said front panel further having a front surface disposed along the same plane as that of a surface of the wall when the television unit is accommodated in the accommodating portion of the wall.

2. A rear projection type television unit according to claim 1, further comprising means for attaching said front panel to the front portion of said television body at corner portions thereof.

3. A rear projection type television unit according to claim 1, further comprising first angle members secured to both side surfaces of the television body, said first angle members including fastening members being engaged with holes formed in said second angle members secured to both inner side portions of the accommodating portion so as to stably set and support the television body int he accommodating portion.

4. A rear projection type television unit according to claim 1, wherein four engaging members are respectively disposed in four corner portions of the television body and four holes are respectively formed in for corner portions of the front panel at portions corresponding to the location of the four engaging members, respectively.

5. In a combination of a rear projection type television and a structure to be fitted in a recessed portion formed in a wall of a room for accommodating the rear projection type television therein, the improvement wherein said rear projection type television comprises a television body having an outer casing which is fitted in the recessed portion formed in the wall of a room and in which electric and optical parts are accommodated and having an engaging member, and a front panel detachably attached to a front portion of the television body so as to entirely cover the front portion thereof, said front panel being provided with a hole with which said engaging member is engaged, said front panel integrally including control circuitry for controlling an operation of said television unit, a screen on which color images are formed, and a portion adapted to cover a loudspeaker, said front panel further having a front surface disposed along substantially the same plane as the surface of the wall when the television is fitted in the recessed portion of the wall.

6. A combination according to claim 5, wherein said front panel is detachably attached to the front portion of said television body at corner portions thereof.

7. A combination according to claim 5, wherein said television body is provided with a first connector and said structure is provided with a second connector which is engageable with said first connector when said television body is fitted in the recessed portion of the wall.

8. A combination according to claim 7, wherein said first and second connectors comprise angle members secured to side portions of said television body and said structure.

* * * * *